United States Patent [19]

Udo et al.

[11] 4,168,968

[45] Sep. 25, 1979

[54] STEELMAKING PROCESS

[75] Inventors: Isao Udo, Nishinomiya; Tatsuya Kai, Himeji; Masahiro Kuwashiro, Ibo, all of Japan

[73] Assignee: Toshin Seiko Kabushiki Kaisha, Tokyo, Japan

[21] Appl. No.: 810,766

[22] Filed: Jun. 28, 1977

Related U.S. Application Data

[62] Division of Ser. No. 742,137, Nov. 10, 1976, Pat. No. 4,077,614, which is a division of Ser. No. 614,334, Sep. 17, 1975, abandoned.

[51] Int. Cl.² .................................. C21C 5/52; C21C 7/10
[52] U.S. Cl. .......................................... 75/60; 75/12; 75/49
[58] Field of Search ..................... 13/2, 9; 75/10–12, 75/49, 60

[56] References Cited

U.S. PATENT DOCUMENTS

| | | | |
|---|---|---|---|
| 3,197,539 | 7/1965 | Hinds | 13/9 |
| 3,459,867 | 8/1969 | Estes | 13/9 |
| 3,708,599 | 1/1973 | Krause | 75/12 |
| 3,902,889 | 9/1975 | Malin | 75/12 |

*Primary Examiner*—P. D. Rosenberg
*Attorney, Agent, or Firm*—Haseltine, Lake & Waters

[57] ABSTRACT

A cold charge of steel scrap is melt cut and melted in an arc furnace provided with special oxygen-fuel burners by which rapid melting is promoted, the interior of the furnace being maintained under negative pressure by a fume evacuation and filtration means thereby to draw in secondary air from the outside atmosphere and, moreover, to increase the burner combustion efficiency. The arc furnace is provided with water cooling devices including a water-cooled ring, carbonaceous bricks, high-alumina ramming masses, and burner tiles in parts of the furnace wall and roof, particularly at wall parts where the burners are mounted, the wall above the slag line, and a roof part where an exhaust gas outlet is formed.

3 Claims, 12 Drawing Figures

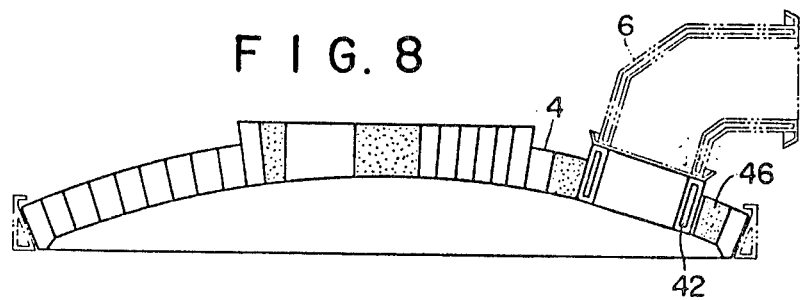
FIG. 8
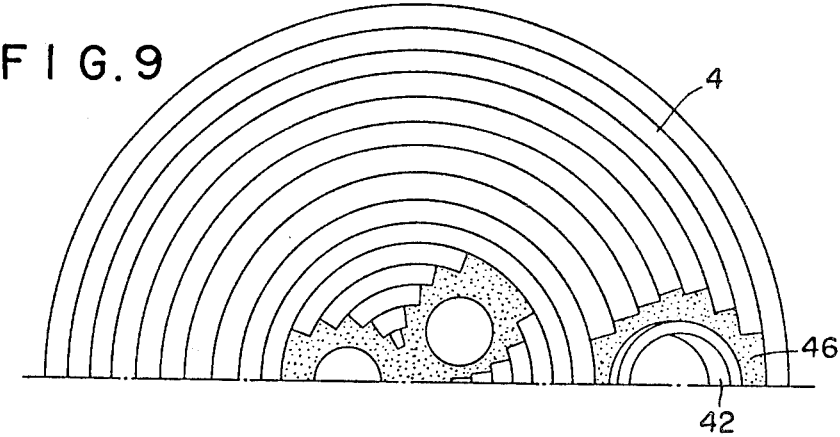
FIG. 9
FIG. 10
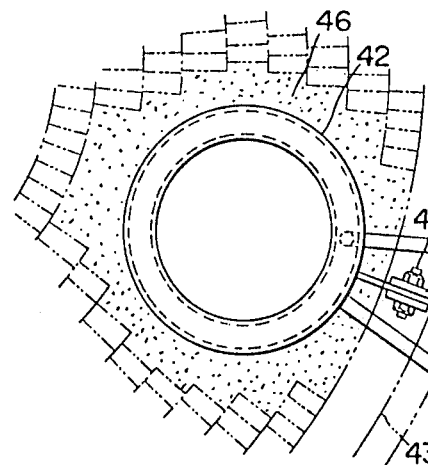
FIG. 11
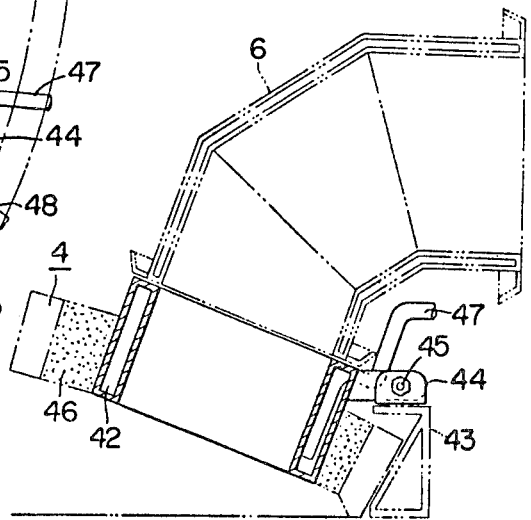

STEELMAKING PROCESS

This is a division of application Ser. No. 742,137 filed Nov. 10, 1976 now Pat. No. 4,077,614, which is a division of Ser. No. 614,334 filed Sept. 17, 1975 now abandoned.

BACKGROUND OF THE INVENTION

This invention relates generally to steelmaking processes and more particularly to a steelmaking process wherein an (electric) arc furnace with assisted combustion is used.

More specifically, this invention relates to a rapid steel melting process in an arc furnace for producing ordinary carbon steels and alloy steels from a cold charge of steel scrap as raw material and to related apparatus comprising an integrated combination of the arc furnace, special oxygen-fuel oil burners installed in the furnace for effecting assisted melting, and a fume evacuation system and incorporating a number of innovations in various parts of this apparatus.

By the provisions of this invention, the steelmaking apparatus can be operated continuously and efficiently over a long period with remarkably reduced time for maintenance shutdowns.

In recent years there has been widespread use of the so-called ultra-high-powered process (U.H.P. process) and, in some instances, auxiliary or assisted combustion systems, for the purpose of increasing the efficiency of (electric) arc furnaces for steelmaking in which a cold charge such as steel scrap is used as raw material.

In this U.H.P. process, which has in one bound become the focus of intense attention through the proposals and disclosures by W. E. Schwabe and others, use is made of a transformer of a capacity which is 1.5 to 2.0 times that of a conventional furnace of the same operational capacity, and the operation is conducted with a short arc. This process, however, is still accompanied by several problems, among which are high investment cost or initial cost for equipment and the limitation of location to one where a large power supply is available. Furthermore, in actual operation, the following difficulties are encountered because the operation is carried out with a low power factor of low voltage and high current.

1. In the U.H.P. process, since the operation is generally carried out with high current, much Joule's heat and electromagnetic force are generated and accelerate damage to the electrode holders and oxidation and wear of the electrodes. Furthermore, thermal stresses due to temperature difference between the exterior and interior of the electrode tend to produce damage such as breaking, splitting, and spalling of the electrodes.

2. In general, as the electrical capacity is increased, the melting time for steel scrap is reduced, and the ratio of the total power-on time A from start to tap (i.e., the time during which steelmaking work is actually carried out) and the power-off time B from tap to start (i.e., the time from tap to the succeeding power-on and the time such as that spend in charging of scrap steel and repair of parts such as furnace wall refractories), that is, the effective operational rate or practice ratio $A/(A+B) \times 100\%$ of the furnace, tends to become low, and the effectiveness of equipment investment decrease in some cases.

3. Since the distance between the steel scrap and the electrodes fluctuates, in the melting period wherein the bulk density of the steel scrap in the furnace is low, operation with a short arc is more disadvantageous than that with a long arc in order to shorten the melting time.

4. Concentrated local damage due to melting of the refractories of the furnace walls and roof caused by powerful electric arcs generated between the electrodes and the steel scrap is severe.

Because of the above enumerated difficulties, the practice ratio of the furnace as a whole is lowered, and, when considered from the viewpoint of long-period and continuous operation, the process entails several features which are not advantageous improving productivity and economy.

On one hand, the so-called "Shell Toroidal" burner used in the Fuel, Oxygen, and Scrap (F.O.S.) process developed in England is at present a representative example of an auxiliary burner for an assisted melting process. The advantages afforded by the installation of this system in an arc furnace for steel-making are as follows.

1. This system can be installed with relative ease in an already existing arc furnace.

2. A tremendous equipment investment is not required as in the U.H.P. process.

In actual practice, however, several problems are encountered, the principal being as follows, whereby there is a limit to the effectiveness of the system.

An ordinary burner of the type representably by the "Shell Toroidal" burner is used for the purpose of preheating and melting steel scrap by means of a high-temperature flame. In a closed furnace such as an arc furnace, however, there is no combustion chamber, and it is difficult to use a large quantity of fuel. Furthermore, as a natural consequence, it is necessary to generate a flame of short frame. Provisions have been devised for this necessity but give rise to the following problems.

1. Low thermal efficiency

In the case of a "Shell Toroidal" burner in which the fuel is atomized with pure oxygen, the theoretical combustion temperature becomes approximately 2,800° C. On one hand, in a high-temperature region, the dissociation coefficients of $CO_2$ and $H_2O$ increase, and the latent heats become even higher than 50 percent.

The average temperature of the steel scrap is very low, of course, and when the combustion gases contact this material to be heated, combustion takes place on the outer surface, where by recombination occurs. Consequently, heat of reaction is generated. By advantageously utilizing this characteristic, rapid heating becomes possible. However, if an error is made in the use of the burner, the latent heat in the exhaust gases will increase and give rise to a great drop in thermal efficiency. It can be seen from this that during the initial period when the cold charge has been placed in the furnace, the process is relatively effective, but the thermal efficiency decreases with increase in the temperature of the material being heated.

2. Limit to period of use

While the steel scrap oxists with an appropriate bulk density in the furnace, the flame issuing from the burner disperses suitably within the body of steel scrap pieces, but as the quantity of molten steel increases, and the material being heated becomes dense, its surface area becomes small. For this reason, the coefficient of heat absorption decreases, and, at the same time, the temperature of the exhaust gas increases. As a consequence, in general, effectiveness is afforded in only the first part, excluding the last period of the melting.

3. Much damage to the furnace facilities

Severe local melting damage occurs at each burner orifice and frame contact parts, and, at the same time, excessive rise in the temperature of the atmosphere within the furnace generally hastens melting damage of the furnace wall bricks, increases the brick consumption, and entails economic disadvantage. On one hand, the rise in the waste gas temperature is accompanied by a rise in the temperature of the cooling water of the furnace body, and problems associated with the cooling water piping readily arise. Furthermore, in the dust collector, also, trouble such as breakage of the bag filter and deficient suction performance occur and give rise to an increase in the damage to the accessory facilities thereof.

4. Difficulty in maintenance because of complexity of the mechanism of the burner and entire apparatus.

In the case of a burner in which the fuel is caused to undergo combustion by atomizing it directly with pure oxygen, damage to its working end is caused by back firing of the flame at a high temperature. Furthermore, because of special provisions such as a safety device for holding any back fire within the burner cylinder, a complicated structure at the burner tip for causing a toroidal curve to be defined, and a ratio setter for proportional control of the fuel-air ratio, the entire burner device becomes complicated and expensive in production and difficult to maintain.

Because of the above enumerated problems 1 and 2, the limit to the output produced in this process is generally considered to be of the order of 20 percent of the total input energy of the arc furnace from the operational and economic viewpoint, although this depends on the factors of the efficiency of the burners and the prices of electric power, oxygen, and fuel oil. By the practice of this invention, the output is increased by the unique mechanism of melt cutting and melting of the cold charge of scrap and the like by the burners. Furthermore, because of the above problems 3 and 4, difficulties in maintenance are encountered, but by the improvements in construction of the burners for injection of oxygen and fuel oil and in the burner mounting parts and other novel innovations according to the invention, these difficulties are overcome and remarkable improvements are attained as described below.

SUMMARY OF THE INVENTION

It is an object of this invention to solve the above described problems accompanying the high-powered process (H.P. process) carried out in conjunction with an arc furnace and the assisted combustion process using "Shell Toroidal" burners and to provide a process and series of devices for and organization of an arc furnace by which the above mentioned problems can be solved, and a continuous and highly efficient operation can be carried out over a long period with high stability and productivity.

While this invention provides special oxygen-fuel oil burners (hereinafter referred to as oxygen-fuel burners) in an arc furnace designed to produce ordinary carbon steels and alloy steels with a cold charge of steel scrap as raw material, its principal feature is not merely the introduction of high energy by means of special burners in additon to electric energy but the provision of a comprehensive technique including features such as the use of furnace walls having carbonaceous bricks and water cooling means for preventing melting damage to furnace wall refractories of the electric arc furnace, a furnace roof having a water cooling ring for increasing the durability, thereof, and a fume evacuation system for sustaining high-efficiency operation and of an integrated organization of devices therefor.

According to this invention in one aspect thereof, briefly summarized, there is provided a steelmaking process in which use is made of an arc furnace for producing ordinary steels and alloy steels from a cold charge of steel scrap as raw material in the arc furnace, and which comprises injecting an oil fuel and oxygen into the furnace interior through oxygen-fuel burners installed with specific mounting angle in the furnace wall and thus carrying out combustion of the fuel thereby to assist the arc in rapid melting of the raw material and, at the same time, drawing off exhaust gas from the furnace interior by fume evacuation means to place the furnace interior under negative pressure thereby to draw secondary air from outside the furnace into the interior thereof and thereby to increase the furnace combustion efficiency.

According to this invention in another aspect thereof, there is provided steelmaking apparatus comprising an arc furnace for producing ordinary steels, alloy steels, and the like from a cold charge of steel scrap as raw material and fume evacuation means for drawing exhaust gas and dust out of the furnace interior and, at the same time, creating a negative pressure in the furnace interior, the arc furnace being characterized by: (1) a furnace wall formed of carbonaceous brick upward from a point slightly above the slag line within the furnace and cooled by water-cooled boxes imbedded therewith; (2) a furnace roof having an outer peripheral part made of steel-cased, magnesite-chrome bricks, a central part around electrode insertion holes provided with high-alumina ramming mass, and a part around an exhaust port provided with a water-cooled ring and high-alumina ramming mass disposed therearound; and (3) a plurality of oxygen-fuel burners each mounted in inserted state with specific orientation in the furnace wall and provided with means for ejecting oxygen and a fuel to cause a combustion flame to be injected into the furnace interior and with water-cooling means at the part of the burner inserted through the furnace wall, the part of the furnace wall around the water cooling means being provided with burner tiles.

The nature, utility, and further features of this invention will be apparent from the following detailed description with respect to one example of preferred embodiment of the invention when read in conjunction with the accompanying drawings, throughout which like parts are designated by like reference numerals.

BRIEF DESCRIPTION OF THE DRAWINGS

In the drawings:

FIG. 8 is an elevation, in vertical section of the furnace roof;

FIG. 9 is a plan view showing one half of the furnace roof shown in FIG. 8;

FIG. 10 is a relatively enlarged, fragmentary plan view showing an exhaust outlet of the furnace roof;

FIG. 11 is a relatively enlarged, fragmentary elevation, in vertical section, of the exhaust outlet shown in FIG. 10.

DETAILED DESCRIPTION

General Organization of Apparatus

Figure 1:
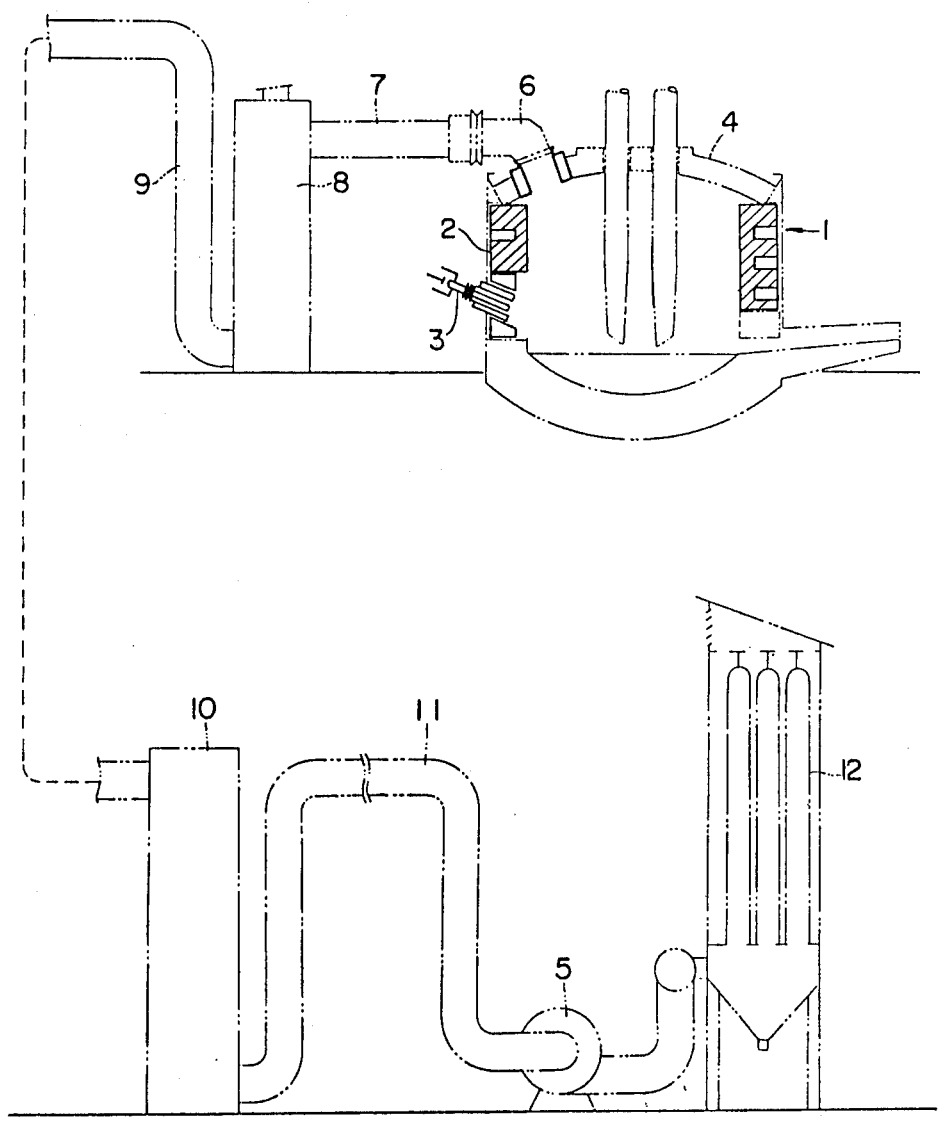
FIG. 1 is a layout diagram showing the essential components and arrangement thereof of one example of steelmaking apparatus according to this invention.

The example of steelmaking apparatus according to this invention, as shown in FIG. 1, comprises essentially an arc furnace 1 having a furnace wall 2 and a furnace roof 4, a plurality of oxygen-oil burners 3 provided in the furnace wall 2, and a fume evacuation system comprising a water-cooled suction elbow 6 connected to the furnace roof 4, a water-cooled duct 7 connected to the outer end of the elbow 6, a combustion column 8 to the upper part of which the outer end of the duct 7 is connected, a gas cooling tower 10, a water-cooled, jacket connecting the upper part of the gas cooling column 10 to the lower part of the combustion chamber 8, an flow pipe 11 for exhaust gas connected at one end to the lower part of the tower 10, an exhaust fan 5 connected to the other end of the air jacket 11 and operating to draw exhaust gases through the furnace roof 4 and through the above named parts of the fume evacuation system, and a bag filter 12 through which the exhasut gases thus drawn are passed for filtration and then discharged into the atmosphere.

The various components constituting this steelmaking apparatus will now be successively described in detail.

1. Oxygen-Fuel Burners

In accordance with this invention, special oxygen-fuel burners 3 are mounted in the arc furnace 1 and accomplish rapid melting of steel scrap. The function of these special burners with respect to the melting of steel scrap differs fundamentally from that of conventional burners of assisted melting equipment which, with a high-temperature flame, heat and melt cold charges such as steel scrap.

The function of the special burners of the invention is (1) first, to heat the cold charge such as steel scrap to red heat by the combustion of the fuel and to eject a large quantity of still unreacted oxygen as a jet stream of high velocity (approximately 800 meters/sec.) thereby to melt cut and melt directly the steel scrap or the like and (2) to cause effective oxidation reaction with combustible matter (e.g., oil adhering to the steel scrap) charged simultaneously with the steel scrap into the furnace and to apply the resulting heat to the cold charge such as steel scrap.

1-1. Burner mechanism

Each of these special oxygen-fuel burners has a structural arrangement, as described more fully hereinafter, wherein a mixture gas stream resulting from atomization of a fuel oil with air is ejected through the center of the working end of a burner cylinder, and, a large quantity of oxygen is ejected at high velocity from around the center stream in a form to encompass the same. During this operation, the air for atomizing the fuel oil is caused to undergo spiral movement by a helical vane provided within a burner cylinder, and, furthermore, thorough mixing of the fuel oil and air is carried out by an agitating impeller of a mixing chamber. A rotational movement is imparted to this mixture stream. This mixture stream is caused by a conical constriction to assume a high velocity and be ejected through an injection orifice to become a jet stream of rod shape, which does not diffuse into the surrounding region until it has traveled through a certain distance, being encompassed during this interval by oxygen ejected at high velocity from at least three other injection orifices. For this reason, these streams assume a long focus shape of high velocity and concentrate at a single point, thereby promoting the cutting and melting of the steel scrap.

1-2. Burner construction

Figure 2:
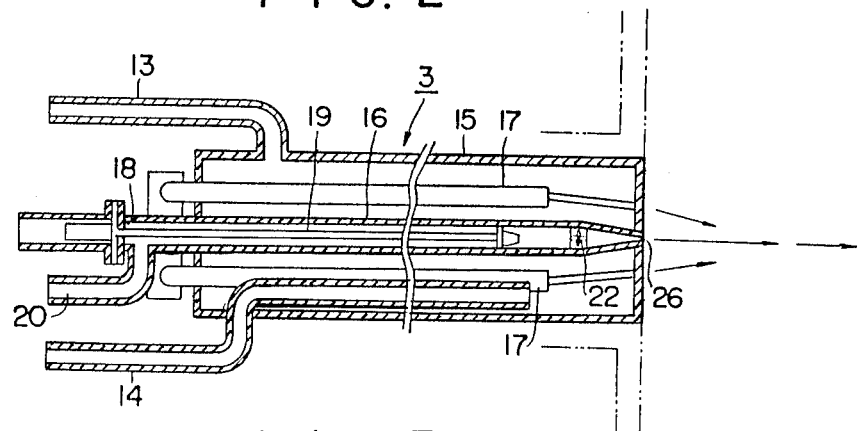
FIG. 2 is a side view, in longitudinal section, of an oxygen-oil burner according to the invention.
Figure 3:
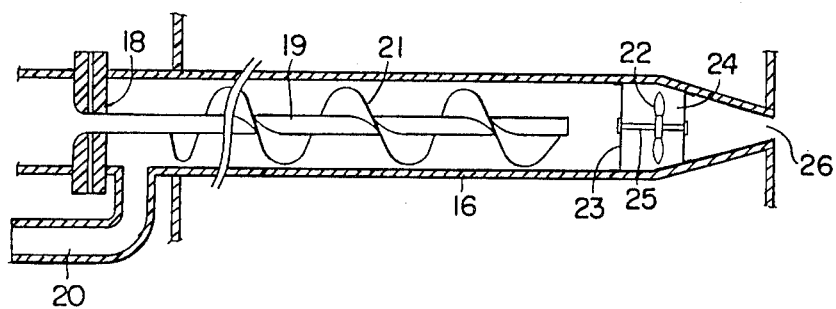
FIG. 3 is a relatively enlarged side view, in longitudinal section, showing an example of a nozzle body part of the burner shown in FIG. 2.

One specific example of a burner as illustrated in FIGS. 2 and 3 will now be described.

Referring to FIG. 2, the oxygen-fuel burner 3 has a cooling cylinder 15 constituting an outer casing to which a cooling water supply pipe 13 and a cooling water discharge pipe 14 are connected. Through this cooling cylinder 15 and along the longitudinal centerline thereof, there is inserted a burner cylinder 16 adapted to mix a fuel oil and air and eject the mixture. A plurality (three in instant example) of oxygen supply pipes 17 are disposed within the cooling cylinder 15 and around the burner cylinder 16.

The burner cylinder 16 has therewithin a bulkhead wall 18 at its rear part, and through this wall 18 and along the centerline of the burner cylinder 16, a relatively thin fuel oil supply pipe 19 is disposed to extend from the wall 18 toward the front or working end of the burner cylinder, or toward the right as viewed in FIGS. 2 and 3. The space thus formed between the burner cylinder 16 and the fuel supply pipe 19 constitutes a passageway for air, which is supplied with air by an air supply pipe 20 connected to the burner cylinder 16 at the rear part of the air passageway. A helical vane 21 is provided around the fuel supply pipe 19 from the connection of the air supply pipe 20 to the front end of the fuel supply pipe.

In front of and in a position to confront the forward open end of the fuel supply pipe 19, there is provided an agitating vane structure 22 for mixing the fuel and air. This agitating vane structure 22 is mounted on a shaft 25 coaxially alined with the fuel supply pipe 19 and rotatably supported on bearing support members 23 and 24 fixed to the inner wall surface of the burner cylinder 16 and is rotated by the stream of fuel oil and air.

The front ejection end of the burner cylinder 16 is convergently tapered to an ejection orifice 26. The discharging nozzles of the above mentioned oxygen supply pipes 17 are so directed that their flow axes interset the flow axis of the ejection orifice 26 at a point in front of or downstream from the ejection orifice 26.

By the above described structural arrangement of the burner 3, the fuel oil supplied through the fuel supply pipe 19 and the air supplied through the air supply pipe 20 and caused by the helical vane 21 within the burner cylinder 16 to advance as a twisting flow merge in front of the forward end of the fuel supply pipe 19. As a result of this combined flow of the fuel and air, the agitating vane structure 22 rotates, whereby the fuel and air are thoroughly mixed and are ejected out in a straight-line form through the ejection orifice 26. At the same time, oxygen from the oxygen supply pipes 17 is ejected in a manner to encompass the fuel-air mixture jet until it intersects this mixture jet in a region where combustion takes place with the generation of maximum temperature.

1-3. Number and positions of burners

Figure 4:
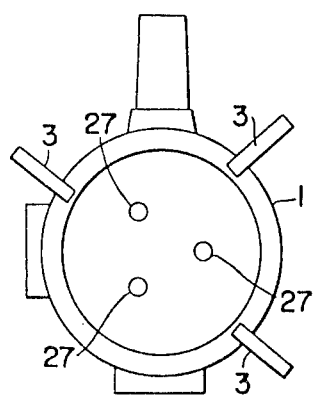
FIG. 4 is a simplified plan view showing the positions and orientations of installation of the oxygen-oil burners in an arc furnace according to the invention.
Figure 5:
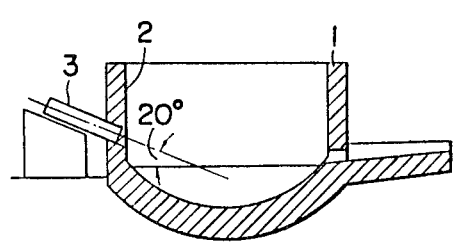
FIG. 5 is a simplified elevation, in vertical section, showing the angle of installation of a burner relative to the horizontal plane.

The special oxygen-fuel burners 3 used in the apparatus of this invention are installed in cold spot parts of the furnace wall 2 of the arc furnace, as shown in FIGS. 4 and 5, with due consideration of the burner installation height and dip angle (relative to the horizontal) so as to attain maximum melt cutting and melting of the cold charge of steel scrap and the like charged into the furnace. Each burner is thus inserted into the furnace in a direction such that the extension of the centerline of its burner cylinder will be clear of any of the electrodes 27 and will intersect the plane of the slag line at a point short of the vertical centerline of the furnace.

In the example 50-ton arc furnace, these burners 3 are installed in the furnace wall at positions approximately 600 to 1,000 mm. above the slag line, with a dip angle of approximately 20 degrees, and in directions not passing through the electrodes. Furthermore, the number of these burners is selected on the basis of factors such as the size of the furnace. FIGS. 4 and 5 shown the positions and number of the special oxygen-fuel burners installed in a 50-ton arc furnace. In this example, the extensions of the centerline of each burner intersects the slag line at a point somewhat short of the vertical centerline of the furnace.

In general, in the case where burners of this character are installed in an arc furnace, the forward end of each burner is exposed to not only heating by its own high-temperature flame but also to heat due to reflected flame from the combustion materials within the furnace and heat radiated from the molten steel and is severely oxidized and damaged.

This damage is not limited to the front end of each high-temperature burner but is similarly to be found in the furnace wall in the neighborhood of each burner, and the frequency of such damage it very high.

The use of a burner must be stopped not only when the front end of its burner cylinder is damaged but also when the furnace wall is damaged. Intermittent stoppage with considerable frequency of the furnace operation for this reason gives rise to a drop in the steelmaking efficiency and an accompanying rise in production cost.

Furthermore, while a damaged burner cylinder can be readily replaced, the furnace wall must be repaired each time a portion thereof is damaged. For this repair, moreover, because of the requirements for forming the burner insertion aperture, it is necessary to use special, expensive materials such as refractory materials of special shape and burner tiles filled with a refractory material of indeterminate form such as castable refractories, whereby the production cost is further increased.

A further problem in a conventional apparatus of this character is the ejection of heat and noise from the furnace interior to the outside through gaps formed between the peripheral part of each burner and the inner surface of the burner insertion aperture, whereby the work environment is greatly impaired.

1-4. Burner mounting parts

Figure 6:
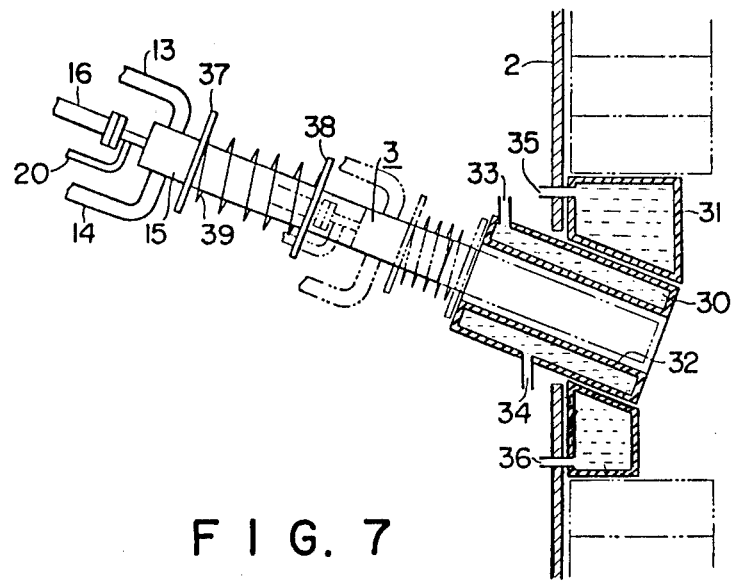
FIG. 6 is a relatively enlarged elevation, for the most part in vertical section, showing details of the part of an oxygen-oil burner where it is fitted into and secured to the furnace.

This invention contemplates overcoming these difficulties by providing novel improvements also for the mounting parts of the burners. For forming the structure around the apertures through which the burners are inserted into the furnace, which structure, being exposed to strongly oxidizing flame at high temperature, is most apt to be damaged by heat, burner tiles made of a metal having excellent resistance to oxidation and high thermal conductivity, such as pure copper, and having a melting point above 1,000° C. are provided in place of refractories. In addition, burner boxes made of a metal such as steel, which has good thermal conductivity and resistance to oxidation and suitable strength at high temperatures, and which, moreover, is relatively inexpensive are provided around the burner tiles. Still another novel innovation is a sealing device comprising, essentially, a steel plate and spring for pressing on the plate and installed between each burner body and the corresponding burner tile for completely sealing the gap therebetween. A specific example of this device will now be described with reference to FIG. 6.

The furnace wall 2 at its part for insertion therethrough of each oxygen-oil burner 3 is provided with inner and outer, double (cooling) water frames 30 and 31. The inner water frame 30 has a hollow cylindrical shape with a central bore 32 for insertion thereinto of the forward or working end of the burner 3 and is made of a metal, such as pure copper, having resistance against oxidation, high thermal conductivity, and a melting point above 1,000° C. This inner water frame 30 is provided with cooling water inlet and outlet 34 and 33.

The outer water frame 31 is made of readily workable iron and supports the inner water frame 30 in the furnace wall 2. This outer water frame 31 is provided with cooling water inlet and outlet 36 and 35 and functions to cool the inner end of the inner water frame 30 and the region of the furnace wall 2 around the burner insertion bore 32.

Although not shown in the drawings, such oxygen-fuel burner 3 is provided with a movable frame which can be freely moved forward (advanced) and rearward (retracted), a mechanism adapted to drive the movable frame and driven in advancing and retracting movements by a motor, and related parts. The burner 3 has a fixed flange 37 at a specific position of its rear part and a movable, ringshape sealing plate 38 slidably fitted around the burner and forward of the fixed flange 37. This sealing plate 38 is connected to the fixed flange 37 by way of a compression coil spring 39 disposed therebetween and around the burner 3 and can thereby retract while still retaining an elastic force for forward sliding movement when it is pushed from the front.

The oxygen-fuel burner 3 with its accessory parts of the above described construction is mounted into operative position as follows. The burner is advanced, and its forward end is inserted into the burner insertion bore 32. Then, as the distance of this insertion of the burner increases, the sealing plate 38, which has contacted and been stopped by the outer end of the inner water frame 30, is pressed with increasing force against the outer end face of the water frame 30 and thereby tightly seals the gap between the burner 3 and the inner water frame 30. The resulting state of these parts is indicated by two-dot chain line in FIG. 6.

With the above described parts in the stated state, a flame is injected from the front end of the burner 3. Consequently, the front end of the burner 3 is subjected to great heat due not only to the heating of the burner itself but also the reflected heat of the combustion materials, the heat of radiation from the molten steel, and other sources, but it is cooled by the cooling water flowing through the inner water frame 30. Furthermore, the inner water frame 30 and the furnace wall 2 in its part surrounding the burner mounting parts are cooled by the cooling water flowing through the outer water frame 31. Accordingly, the parts of the burner 3 and the furnace wall 2 subjected to great heat are amply cooled and maintained in a safe condition.

Still another safety feature of the above described burner mounting is that, since the gap between the inner water frame 30 and the burner 3 at the bore 32 is tightly closed by the sealing plate 38, blowing out of the fire and heat within the furnace is, of course, prevented, and there is no leakage out of noise generated in the furnace.

1-5. Burner performance and other particulars

When the special oxygen-fuel burners 3 are installed in an arc furnace, the standard and maximum quantities of consumption of fuel oil, oxygen, and air for producing one ton of molten steel with high effectiveness are as set forth in Table 1.

| Consumed fluid | Standard consumption | Maximum consumption |
| --- | --- | --- |
| Oil | 6.0 l/t | 8.0 l/t |
| Oxygen | 35 Nm³/t (28 Nm³/t for burner) | 55 Nm³/t (42 Nm³/t for burner) |
| Air | 2.0 Nm³/t | 2.5 Nm³/t |

As one example, the particulars of an example of our experimental operation with high efficiency of an arc furnace of 50-ton nominal capacity in which the instant special oxygen-fuel burners are used set forth in TABLE 2. The particulars of a special oxygen-fuel burner are shown in TABLE 3.

Table 3

| Particulars of oxygen-fuel burner | |
| --- | --- |
| Particular | Numerical Value |
| Dimensions of burner body | |
| Burner cylinder length | 650 mm. |
| Burner cylinder outer diam. | 665 mm. |
| Oil supply pipe diam. | 10 mm. |
| Oxygen supply pipe diam. | 5 mm. |
| Fluid supply capacities | |
| Fuel oil | Max. 500 l/hr.(at 2kg/cm²) |
| Oxygen | Max.1,000Nm³/hr. (at 7kg/cm²) |
| Air | Max.150 Nm/hr.(at 4kg/cm²) |
| Burner body stroke | |
| Length inserted in furnace | 250 mm. |
| Length retracted out of furnace | 600 mm. |

2. Furnace Wall and Roof

In the operation of the steelmaking apparatus of the invention, the above described special oxygen-fuel burners are used to inject high energy generated by the combustion of the fuel oil into the arc furnace thereby to cause the steel scrap to melt rapidly. For carrying out this operation over a long period in a stable manner, the wall 2 and roof 4 of the arc furnace 1 must have ample resistance to withstand the high heat. This invention provides a solution to this problem by the use of special innovations in the furnace wall and roof refractories, themselves, and in their construction as described below.

2-1. Furnace wall refractories

The furnace wall 2 of the arc furnace in the apparatus of the invention has a construction in which, essentially, special carbonaceous bricks and water-cooling means are combined and assembled in a sandwiched state of several tiers.

In general, the furnace wall of a furnace which has the object of melting metals must have excellent resistance to fire and to erosion, heat insulative property, Table 2

| Number of heats | Heat Serial No. | Time of operation start | Melting time | Refining time | Repair time | Total steel weight (t) (Tap to tap) | Charged scrap weight (t) | Produced billet weight (t) | Total oil consumption (liter) | Oil consumption per ton billet (l/t) | Total Oxygen consumption (Nm³) | Oxygen consumption per ton billet (Nm³/t) | Total power consumption (KWH) | Power consumption per ton billet (KWH/T) |
| --- | --- | --- | --- | --- | --- | --- | --- | --- | --- | --- | --- | --- | --- | --- |
| 1 | 2398 | 6°14 | 45 | 14 | 8 | 1°07 | 52,300 | 49,260 | 291 | 5.9 | 2040 | 41.4 | 17,700 | 359 |
| 2 | 2399 | 7°21 | 46 | 13 | 6 | 1°05 | 52,580 | 49,460 | 268 | 5.4 | 2020 | 40.8 | 16,000 | 335 |
| 3 | 2400 | 8°26 | 48 | 13 | 6 | 1°07 | 53,200 | 48,280 | 272 | 5.6 | 2180 | 45.0 | 16,300 | 337 |
| 4 | 2401 | 9°33 | 50 | 12 | 7 | 1°09 | 52,640 | 47,020 | 287 | 6.1 | 20.80 | 44.2 | 15,900 | 338 |
| 5 | 2402 | 10°42 | 47 | 11 | 8 | 1°06 | 53,460 | 47,920 | 278 | 5.8 | 1850 | 38.6 | 16,400 | 344 |
| 6 | 2403 | 11°48 | 50 | 13 | 6 | 1°09 | 52,935 | 49,460 | 273 | 5.5 | 2130 | 43.1 | 17,100 | 346 |
| 7 | 2404 | 12°57 | 48 | 12 | 6 | 1°06 | 52,820 | 47,130 | 277 | 5.9 | 2110 | 44.8 | 16,600 | 352 |
| 8 | 2405 | 14°03 | 48 | 14 | 8 | 1°10 | 53,100 | 49,180 | 291 | 5.9 | 2290 | 46.6 | 16,600 | 337 |
| 9 | 2406 | 15°13 | 51 | 10 | 6 | 1°07 | 52,580 | 49,080 | 311 | 6.3 | 2270 | 46.3 | 17,200 | 350 |
| 10 | 2407 | 16°22 | 43 | 12 | 7 | 1°02 | 52,510 | 48,130 | 310 | 6.4 | 2280 | 47.4 | 15,100 | 314 |
| 11 | 2408 | 12°22 | 48 | 12 | 5 | 1°05 | 52,660 | 47,500 | 308 | 6.5 | 2210 | 46.5 | 16,200 | 341 |
| 12 | 2409 | 18°27 | 46 | 13 | 7 | 1°06 | 52,760 | 50,080 | 338 | 6.8 | 2300 | 45.9 | 16,300 | 326 |
| 13 | 2410 | 19°33 | 43 | 10 | 7 | 1°09 | 51,180 | 48,100 | 312 | 6.5 | 2020 | 42.0 | 14,700 | 306 |
| 14 | 2411 | 20°33 | 47 | 11 | 6 | 1°04 | 52,540 | 49,520 | 312 | 6.3 | 2250 | 45.4 | 15,500 | 313 |
| 15 | 2412 | 21°37 | 52 | 13 | 6 | 1°11 | 52,120 | 49,390 | 295 | 6.0 | 2270 | 46.0 | 16,400 | 332 |
| 16 | 2413 | 22°48 | 47 | 15 | 6 | 1°08 | 52,580 | 49,790 | 252 | 5.1 | 2200 | 44.2 | 16,600 | 333 |
| 17 | 2414 | 23°55 | 49 | 12 | 6 | 1°07 | 52,640 | 49,480 | 296 | 6.0 | 2350 | 47.5 | 16,100 | 325 |
| 18 | 2415 | 1°04 | 50 | 13 | 6 | 1°09 | 51,960 | 47,490 | 265 | 5.6 | 2260 | 47.6 | 16,200 | 341 |
| 19 | 2416 | 2°12 | 48 | 14 | 6 | 1°08 | 52,200 | 48,580 | 277 | 5.7 | 2380 | 49.0 | 16,200 | 334 |
| 20 | 2417 | 3°17 | 47 | 12 | 6 | 1°05 | 51,940 | 47,350 | 280 | 5.9 | 2300 | 48.6 | 16,200 | 343 |
| 21 | 2418 | 4°26 | 51 | 12 | 6 | 1°09 | 52,420 | 48,680 | 295 | 6.1 | 2360 | 48.5 | 16,400 | 338 |
| 22 | 2419 | 5°36 | 52 | 11 | 7 | 1°10 | 52,280 | 48,670 | 296 | 6.1 | 2320 | 47.7 | 15,300 | 315 |
| Average | | | 48 | 12 | 6 | 1°07 | 52,520 | 48,616 | 290 | 6.0 | 2191 | 45.1 | 16,250 | 335 | and high strength at high temperatures. While this is true in other reheating furnaces, in a steelmaking furnace intended for producing steels from steel scrap as raw material, there is a particular necessity for excellent resistance to damage such as spalling of the furnace brick faces.

For meeting these requirements, the use of carbonaceous bricks formed as matrixes by applying carbon to a refractory material such as magnesite as an aggregate and having a softening temperature of 1,500° to 1,900° C., resistance to heat and spalling, and strength at high temperatures which are all for superior to those of other furnace wall bricks is known to be effective. Carbonaceous bricks, however, are accompanied by certain difficulties such as a lowering of resistance to slag attack at high temperatures and a high value of thermal conductivity which is nearly 10 times that of an ordinary firebrick.

In accordance with this invention, the arc furnace wall comprises furnace wall refractories in which the characteristic of high thermal conductivity of carbonaceous brick, conversely, is utilized to good advantage to provide superior shall refractories of the arc furnace for steelmaking having the combination of excellent resistance to heat, resistance to slag attack, and high strength at high temperatures. More specifically, the furnace wall rising from a point slightly above the slag line in the arc furnace is formed from carbonaceous brick, and, moreover, a number of tiers of water cooling means are arranged in a state wherein the carbonaceous bricks are interposed and sandwiched therebetween. By this construction, excessive temperature rise of the carbonaceous bricks themselves is prevented, whereby the resistance of the carbonaceous bricks to slag attack is increased, and only the other desirable characteristics of these bricks are effectively utilized.

These carbonaceous bricks used in the practice of this invention have a carbon content higher than 99 percent, a porosity of 28 to 29 percent, a bulk density of 1.5 to 1.6, and a thermal conductivity of 120 to 150 kcal./m.h.°C.

Figure 7:
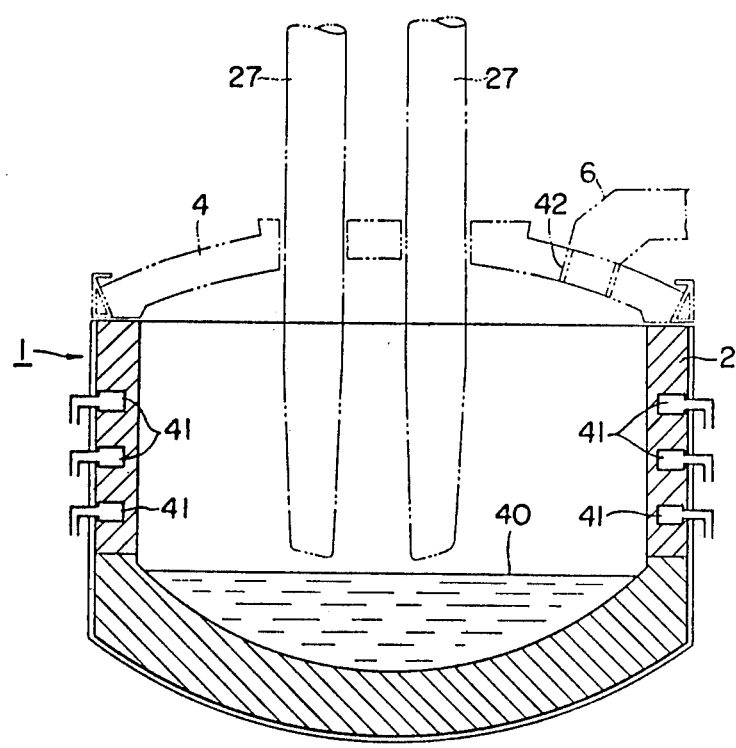
FIG. 7 is a simplified elevation, in vertical section, showing the furnace wall construction.

Referring to FIG. 7, the arc furnace 1 shown therein has an upper furnace wall 2 rising from a level approximately 200 mm. above the slag line 40 and made of carbonaceous bricks. This furnace wall 2 contains a plurality of tiers (three in the illustrated example) of built-in water-cooled boxes 41, the lowest tier being disposed 300 to 500 mm. above the slag line 40 and the other tiers being successively distributed upwardly therefrom with spacing intervals of the order of 300 mm.

In the case where the thickness of the furnace wall 2 is of the order of 350 mm., for example, each water-cooled box 41 is formed with a dimension parallel to the thickness direction of the furnace wall 2 of the order of 200 mm. and a height of approximately 130 mm. and is disposed nearer to the outside surface of the furnace wall. In one example of this water-cooled box 41 installed in a furnace wall of a thickness of the order of 350 mm. (thickness of the carbonaceous bricks) and having a cross sectional dimensions of approximately 130×200 mm., cooling water was supplied under a pressure of 2 kg/cm$^2$, and its flow velocity within the box was from 9.5 to 10 m./min. The reason for this is that, by using a large area of contact with the carbonaceous bricks to increase the cooling effect and thereby to reduce the effect on the atmosphere within the furnace, and by constantly maintaining the cross-sectional area of the box 41 less than 0.03 m$^2$ in order to facilitate brick breaking and dressing in the brick laying work and the flow velocity within the box above 8 m./min., the objects of this invention can be achieved.

Furthermore, in each tier, the water-cooled box 41 may be in the form of a single, ring-shaped, continuous structure or it may be divided along the circumferential direction into 3 or 4 blocks, each of which is supplied therethrough with cooling water circulated through cooling water inlet and outlet pipes connected thereto. By thus dividing the water-cooled box 41 in each tier as in the latter arrangement, it is possible to facilitate the work of maintenance and replacement in cases when defects such as water leakage occur.

While, in the example illustrated in FIG. 7, three tiers of the water-cooled boxes 41 are used, and the box 41 in each block is divided into 3 blocks, the number of tiers (e.g., 2 or 4) and the number of divisions (e.g., 2, 3, or 4) of the water-cooled box in each tier can be suitably selected according to factors such as the size of the arc furnace.

By passing cooling water through the water-cooled boxes 41 within the furnace wall 2 of the above described construction, the furnace wall is cooled because of the high thermal conductivity of the carbonaceous bricks. Accordingly, heating of the carbonaceous bricks to a high temperature is prevented, and damage accompanying the adherence of metal oxides such as iron oxide cannot readily occur. At the same time, the furnace wall 2 retains and can fully exhibit high resistance to heat, high resistance to spalling, and high strength at high temperatures which are the advantageous characteristics of carbonaceous bricks. Thus, this steel-making arc furnace has high overall performance.

As one example, we have carried out a series of experiments with an arc furnace of a nominal heat size of 50 tons in which carbonaceous bricks and water cooling means are combined in the furnace wall, and which was operated with high efficiency with the use of three special oxygen burners. As a result, the furnace wall was found to have a serviceable life of 240 heats at the part of the furnace wall hot spot where the distance between an electrode and the furnace wall is the shortest, and a total life of 1,440 heats when this part was repaired. It was also found that the brick unit consumption of the furnace wall over the last six months by this process was less than 1.8 kg./ton. This is an excellent result, which is ½ to ⅓ of the brick unit consumption in the case of bricks used conventionally.

2—2. Furnace roof refractories

The furnace roof of the arc furnace used in the practice of this invention must be made up of furnace roof refractories which can withstand high temperatures and have long serviceable life in order to make possible stable and efficient operation of the arc furnace over a long period. For this purpose: steel-cased, magnesite-chrome bricks are used for the refractory material in the outer peripheral part of the furnace roof; high-alumina (Al$_2$O$_3$) ramming mass is used in the central part of the furnace roof around the electrode insertion holes; and a water-cooled ring is provided at the exhaust hole where the damage and loss of the refractories are the most severe in furnace roofs of this class, high-alumina ramming mass being formed around this ring.

In general, for the furnace roof refractories of an arc furnace for steelmaking, silica bricks (more than 96% silica) and bauxite bricks, which have excellent heat resistance and strength at high temperatures and are relatively inexpensive, have heretofore been used. However, as the aforementioned U.H.P. process and assisted combustion process were developed, and high energy came to be injected into the furnace, the durability of the conventional silica brick became deficient, and, accordingly, it has become the practice to increase the alumina content in the brick or to adopt magnesite-chrome brick. In spite of these measures, however, when a dust collector of direct evacuation type is additionally used for improving the environment of the steel mill and its surroundings, it has not been possible to avoid a drop in the life of the furnace roof refractories due to melt damage to the peripheral region of the exhaust hole in the furnace roof in the prior art.

In accordance with this invention, it is possible to increase the durability of the furnace roof and achieve the original objects of the invention by providing a newly devised water-cooled ring as described below at the exhaust hole in the furnace roof.

More specifically, as shown in FIGS. 8 through 11, the above mentioned novel water-cooled ring in the furnace roof 4 has a water-cooled ring body 42 installed by a method which, differing from the conventional method of installing on the furnace roof refractories after completion of their assembly, comprises installing the ring body 42 in imbedded state in the refractories and fixing the same with a bolt 45 by way of a bracket 44 to a furnace water-cooled roof ring frame 43, the structure surrounding this water-cooled ring body 42 being formed with high-alumina ramming mass 46. The water-cooled ring 42 is provided with a cooling water supply pipe 47 and a water discharge pipe 48 connected thereto.

Heretofore, the refractories of the furnace exhaust hole have been subject to damage and expansion of the hole due to the passage of high-temperature gas from the furnace interior until they become unable to withstand further use, where the serviceable life of the entire furnace roof also is reduced. According to this invention, however, the use of the water-cooled ring 42 makes it possible to prevent a reduction in the furnace roof life due to expansion of the exhaust hole and thereby to prolong the life of the entire furnace roof.

In one instance of testing, in which a furnace roof 4 according to this invention was mounted on a 50-ton arc furnace, and high-efficiency operation of the furnace was carried out, the life of the high-alumina ramming mass at the central part of the furnace roof was found to be from 120 to 130 heats, and the life of the part of the steel-cased, magnesite-chrome brick at the outer peripheral part and the exhaust hole provided with the water-cooled ring 42 was found to be from 240 to 250 heats.

Accordingly, if the central part of the furnace roof 4 is rebuilt after 120 to 130 heats, the life of the entire furnace roof will be from 240 to 250 heats. In comparison with this, when a water-cooled ring is installed on fire-bricks after the bricks have been laid, as in the convention procedure, the life of the exhaust hole is from 100 to 120 heats. If the refractories of this part are removed together with the central part, the other magnesite-chrome brick parts will also fall off, and the life of the entire furnace roof will be no different from those of the central part and the part of the exhaust hole.

3. Fume Evacuation System

In order to elevate the combustion efficiency of the special oxygen-fuel burners, the regulation of the pressure within the arc furnace during its melting operation is indispensable. As a result of our study, we have found that this combustion efficiency is elevated by maintaining the furnace interior at a negative pressure in the range of from $-0.5$ to $-2.5$ mm. $H_2O$.

We have found that if this pressure is higher than $-0.5$ mm. $H_2O$, the quantity of air drawn into the furnace from the outside wall be small, whereby the combustibles charged together with the cold charge of scrap and the like will not be sufficiently combusted, and the thermal efficiency of the burners will drop remarkably. If the pressure within the furnace is above atmospheric pressure, flames will be ejected from openings in the furnace. On the other hand, if the pressure is less than $-2.5$ mm. $H_2O$, the quantity of infiltrating air will be large, whereby the erosion of the electrodes and the furnace wall will become severe, and, at the same time, since high-temperature gas is discharged through the exhaust hole, there will be increased possibility of problems relating to the exhaust hole and the fume evacuation system. Accordingly, for the above stated reasons, the fume evacuation system of the invention is of a direct-suction type capable of maintaining the pressure within the furnace of from $-0.5$ to $-2.5$ mm. $H_2O$.

In order to increase the combustion efficiency of the special oxygen-fuel burners 3, the pressure within the arc furnace at the time of steel melting is always caused to be negative, and air is drawn through openings such as the slag door into the furnace. Accordingly, the fume evacuation system used in the practice of this invention, in this sense, must be a fume evacuation system of direct suction type.

As one example, an example of determination of the capacity (volume of treated gas) of a fume evacuation system installed in conjunction with an arc furnace of 50-ton nominal capacity rating will be considered. This furnace was provided with the special oxygen-fuel burners, furnace wall lining, water-cooling devices, and other unique features for long life as described above, and which was operated with high efficiency as the principal component of an integrated steelmaking apparatus and with the operational technique of the invention.

This arc furnace had a shell of an inner diameter of 5.1 meters and a transformer capacity of 22,000 kVA. and was provided with three special oxygen-fuel burners. The basic operational specifications of this furnace designed for an oil unit consumption of 6 liters/ton (of steel), an oxygen unit consumption of 35 $Nm^3$/ton (28 $Nm^3$/ton for burners only), an (electric) power unit consumption of 360 kWH/ton, and a tap-to-tap time of 1 hour 10 minutes.

It will now be assumed that the other combustibles (e.g., oil, grease, and other combustible matter adhering to the steel scrap) introduced into the furnace at the same time as the fuel oil injected thereinto through the burners and the steel scrap, coke for blending and recarburizing, and other matter are completely burned with the oxygen injected at the same time through the burners during the steel melting period to become $CO_2$, $H_2O$, and other products, any lack of oxygen being supplied by the oxygen in the infiltrating air introduced into the furnace interior through openings such as the slagging door thereby to effect complete combustion.

Then, the total quantity or flow rate of the exhaust gas from the furnace becomes approximately 375 $Nm^3$/min., and the temperature thereof is estimated at approximately 1,300° C. This high-temperature gas is permitted to mix with air drawn in through gaps between the water-cooled suction elbow and water-cooled duct and air drawn in through other openings in the water-cooled ducts. To obtain a resulting mixed gas of a temperature of 600° C., an infiltration rate of air of approximately 600 Nm³/min. is required. Therefore, the total required suction rate becomes 975 Nm³/min. For a processing temperature of 250° C., this total rate becomes approximately 1,870 m³/min.

Furthermore, a gas cleaning system comprising bag filters is used in the instant fume evacuation system. The filter bags are of silicone-treated fiber and are cleaned periodically by reverse flow of cleaning air of approximately 300 m³/min. This flow rate added to the above total results in a total flow rate of approximately 2,170 m³/min. as the total volumetric flow rate of exhaust gas to be treated, i.e., the processing capacity of the fume evacuation system. From this result, and with some allowance for increase in required capacity, the design capacity was selected at 2,200 m³/min (at 250° C.).

4. Example of Practice

A specific example of practice will now be described in detail with respect to an example of a steelmaking apparatus according to the invention including a 50-ton arc furnace of the following particulars.

4-1. High-efficiency melting

The particulars of the instant arc furnace are set forth in TABLE 4. In this furnace, three special oxygen-oil burners each of the character indicated in TABLE 3 were used. The constructional features of this furnace and related parts were as set forth hereinabove, and a fume evacuation system of the particulars set forth in TABLE 5 was used.

TABLE 4

| Particulars of 50-ton arc furnace | | |
|---|---|---|
| Component | Item | Specification |
| Furnace structure | | |
| | Nominal capacity | 50 tons |
| | Charge quantity (actual) | 54 tons |
| | Shell inner diameter | 5,100 mm. |
| | Shell height | 3,635 mm. |
| | Depth of molten bath | 850 mm. |
| | Furnace internal volume | 40 m³. |
| Transformer | | |
| | Capacity | 22,000 kVA. |
| | Primary voltage | 22 kV |
| | Secondary voltage | 145–400 V |
| | Rated secondary voltage | 366 V |
| | Rated current | 31,700 A |
| Electrodes | | |
| | Diamter | 18 in.(457.2 mm) |

TABLE 5

| Particulars of fume evacuation system | |
|---|---|
| Item | Specification |
| Type of suction | Top-of-furnace, direc-suction type |
| Type of filter | Bag filter type |
| Gas quantity to be treated | 22,000 m³/min (at 250° C.) |
| Filtration area | 3,000 m² (approx.) |
| Fan motor | 450 kW, 1,200 rpm. |

The arc furnace specified in Table 4, as judged from its transformer capacity, falls within the range of high-powered processes but, as a furnace of this character at the present time, is on the lower side of this range. However, by the high-efficiency operation and the apparatus according to this invention the steelmaking time (tap-to-tap) can be shortened to one hour. With two of these arc furnaces the production per year of continuously cast billet is approximately 600,000 tons.

In general, the productive capacity of an arc furnace can be expressed by the number of heats per day (24 hours). However, the capacity of an arc furnace of a nominal rating of the order of 50 tons is ordinarily 8 to 10 heats per day, and even in the case where a high-efficiency measure such as the use of a U.H.P. process or the F.O.S. process is resorted to, it is estimated to be from 12 to 14 heats per day. We have found that by the process and apparatus of this invention, however, this performance is from 20 to 22 heats per day of continuous operation over a long period.

While Table 2 indicates the performance results of operation through one day, many unique characteristics can be observed from this table. For example, the steel-making time (tap-to-tap) is a minimum of 1 hour, a maximum of 1 hour 11 minutes, and an average of 1 hour 07 minutes, which are very short. In addition, it is to be observed that the quantity of oxygen consumed is 45.1 Nm³/ton, which is very large, that the quantity of fuel consumed is less than that of oxygen, and that the electric power consumption is 335 KWH/ton, which is very low.

Three special oxygen-oil burners are installed in this arc furnace as described hereinbefore, and a unique characteristic of their operation is that the quantity of oxygen is very large in comparison with the comsumption of the fuel. More specifically, the theoretical quantity of pure oxygen required for complete combustion of one liter of fuel oil is approximately 2.2 Nm³. However, according to the actual performance results, 36.5 Nm³/ton, which corresponds to approximately 80 percent of the total oxygen quantity of 45.1 Nm³/ton, is used in the burners. This means that oxygen of a quqntity which is approximately 2.8 times the theoretically required oxygen quantity is used in the burners. From the description set forth hereinbefore, it can be seen that this excess oxygen is being consumed for melt cutting of the steel scrap due to oxidation reaction directly with the steel scrap and for causing combustion of combustibles (e.g., oil adhering to the steel scrap) introduced together with the steel scrap into the furnace. The remainder 20 percent of oxygen of the total oxygen quantity is consumed for lancing carried out at the time of cutting and oxidizing refining of the steel scrap by means of lancing pipes through slagging and inspection doors as is carried out also in the operation of an ordinary arc furnace.

While the power supply unit in the operation of an ordinary arc furnace, in general, is from 500 to 550 KWH/ton, that in the instant performance result is 335 KWH/ton, which is very low. The only explanation for this is that the heat of combustion of the fuel oil and the heat of oxidation due to the excess oxygen of and the aforementioned combustibles introduced together with the steel scrap are contributing to the melting of the steel scrap, the excess oxygen also contributing to the melt cutting of the steel scrap.

4-2. Example of heat balance analysis

In general, the power unit consumption in the case where an arc furnace is operated in a very ordinary state is from 500 to 550 KWH/ton. Of this, the power consumed for only the melting of the steel scrap during the melting period is of the order of from 410 to 440 KWH/ton, and the remainder power of 90 to 110 KWH/ton is the power consumed subsequent to melting, that is, in the refining period.

However, in the example of actual performance in Table 2, this power unit consumption is set forth as 335 kWH/ton. In this case, the power consumed for only the melting of the steel scrap is 278 kWH/ton, and a power of 57 KWH/ton is consumed in the refining period. When the quantity of power consumed in the melting period is considered, the difference, 132 to 162 KWH/ton, between the above quantity and that consumed in the melting period in an arc furnace operated in an ordinary state is comparable to the total of the heat of combustion of the fuel oil, the heat generated when the steel scrap is melt cut by excess oxygen, and the heat of combustion of the other combustibles introduced simultaneously with the steel scrap into the furnace.

More specifically, the oxygen consumption for accomplishing complete combustion of to liters/ton of oil is approximately 13 $Nm^3$/ton, and the heat thus generated is 59,400 Kcal/ton. Furthermore, the total oxygen quantity used in the burners is 36.5 $Nm^3$/ton, and when the oxygen quantity required for combustion of the fuel oil is subtracted from this, an oxygen quantity of 23.3 $Nm^3$/ton remains. When 40 percent or 9 $Nm^3$/ton of this remainder is assumed to be consumed for melt cutting of the steel scrap, while 60 percent or 14.3 $Nm^3$/ton thereof is assumed to be consumed for the combustion of the other combustibles introduced together with the steel scrap into the furnace, the generated heat quantity of the former becomes 51,813 Kcal/ton, while that of the latter becomes 16,874 Kcal/ton.

The total of these generated heat quantities due to the fuel oil and the excess oxygen then, becomes 128,087 Kcal/ton, which becomes 149 KWH/ton when converted into electric energy. Accordingly, it is observable that there is a substantial agreement between this and the difference of 132 to 162 KWH/ton in the power unit consumptions of the actual performance result shown in Table 3 and the arc furnace operated in the ordinary state. Thus, it is apparent that the special oxygen-fuel burners of this invention accomplish a great function in promoting the melting of the steel scrap.

Furthermore, in the refining period an oxygen quantity of 8.6 $Nm^3$/ton, which results from the subtraction of the oxygen quantit of 36.5 $Nm^3$/ton used in only the burners from the total oxygen quantity of 45.1 $Nm^3$/ton in Table 2, is blown into the molten steel bath, thereby serving to promote agitation and decarburization of the molten steel. However, in the operation according to this invention, the carbon content in the molten steel bath in the initial part of the refining period is of the order of 0.20 percent, and the greater part of the oxygen blown into the molten steel is used in its oxidation reaction with Fe.

A characteristic feature of this invention, however, is that, since high power is charged into the process as oxygen in blown into the molten steel bath thereby to force a temperature rise, the heat of oxidation of Fe contributes directly, as it is, to the rise of temperature. The heat of oxidation of Fe by 8.6 $Nm^3$/ton of oxygen becomes 49,540 Kcal/ton, which corresponds to 57.6 kWH/ton. Therefore, the contradiction of the power unit consumption for the refining period being a low value of 57 KWH/ton can be accounted for.

4-3. Furnace wall refractories

As mentioned hereinbefore, when a large quantity of thermal energy is introduced in a short time into an arc furnace, heat damage becomes rapid in furnace wall bricks made of magnesite or magnesite-chrome material which were heretofore used, and the furnace wall bricks cannot withstand this kind of operation. Because of the need for repairs, the practice ratio of the furnace drops. This has been considered to be problem accompanying the aforementioned U.H.P. process and the F.O.S. process, and this is problem encountered also in the practice of this invention.

According to this invention, however, this problem has been solved by the use of a furnace wall lining developed on the basis of a totally new concept of combining carbonaceous bricks and water-cooled means as described hereinbefore. In the aforedescribed arc furnace of 50-ton nominal capacity, in which high-efficiency operation is carried out with three special oxygen-fuel burners, the improved lining is used over the entire furnace wall between a line approximately 300 mm. above the slag line and a line approximately 700 mm. below the upper end of the furnace wall. As a result of an experiment carried out recently over 6 months, the unit consumption of all furnace wall bricks was 1.8 kg./ton, and the unit consumption of only the carbonaceous bricks was 1.2 kg./ton. In this case, the serviceable life of parts of the carbonaceous bricks varied with location, and repairs were carried out by partially interchanging the carbonaceous bricks, whereupon a life of 1,440 heats was obtained as a whole.

4-4. Furnace roof refractories

The furnace roof refractories have been developed in exactly the same manner as the furnace wall refractories. When silica bricks (more than 97 percent silica) or bauxite bricks of known character were used, they could not withstand the introduction of high energy into the furnace and came to be replaced by basic bricks or high-alumina bricks. However, in an arc furnace provided with a fume evacuation system of the direct suction type, a fume exhaust hole for drawing off exhaust fumes out of the furnace must be installed as a fourth opening in addition to the holes for three electrodes.

The refractories in the region surrounding this fourth opening are subjected to severe mechanical and physical damage due to the high-temperature exhaust fumes flowing past these refractories, and the life of furnace roof refractories have been extremely short even in the conventional arc furnaces.

Accordingly, in accordance with the present invention, this problem is solved by installing a metal water-cooled ring as described hereinbefore around this fourth opening and arranging refractories of the character previously described, whereby we have succeeded in greatly prolonging the furnace roof life. In the aforedescribed arc furnace of 50-ton nominal capacity having a furnace roof provided with a water-cooled ring, performance results as described hereinbefore were obtained. That is, the life of the furnace roof as a whole was found to be from 240 to 250 heats, which is more than twice that obtainable by the prior art.

4-5. Fume evacuation system

In the practice of this invention with the object of accomplishing efficient operation of an arc furnace provided with the special oxygen-fuel burners, the fume evacuation system has an extremely important and indispensable function. More specifically, in order for the special oxygen-fuel burners to accomplish combustion in an effective manner, it has been found necessary to maintain the interior of the furnace continually under negative pressure throughout the scrap melting period during which these burners are used and thereby to lead the air infiltrating through gaps in the slagging door and the like into the furnace interior. This unique feature constitutes a vital point of know-how in the technology of this invention.

In one example of efficient operational of the afore-described arc furnace of 50-ton nominal capacity provided with the special oxygen-fuel burners, the steel-making apparatus according to the invention included a fume evacuation system of the specifications set forth in Table 5. The value of 2,200 m³/min. (at 250° C.) of the quantity of exaust gases to be treated, determined in the manner described hereinbefore, is greater than that in the case of a general type of 50-ton arc furnace. In this direct evacuation type dust collector, exaust fumes are drawn out of the arc furnace through the fourth h opening, that is, the opening for evacuation in the furnace roof, pass through a double-pipe type, water-cooled suction elbow made of steel, and arc conducted through a water-cooled duct to a double-pipe type, water-cooled combustion chamber. A sliding type double-pipe water-cooling pipe is interposed between the suction elbow and water-cooled duct. By causing this pipe to slide, the infiltration of secondary air through the gap between the suction elbow and the duct is held at a minimum.

For this reason, of the incompletely burned gases drawn out of the furnace, incompletely combusted CO gas under-goes combustion with air drawn in through the top of the vertical combustion chamber, and, at the same time, with an even greater quantity of cool air, the temperature of the exhaust gases is lowered. The gases which have passed through the combustion chamber are further passed through a double-pipe, water-cooled duct and cooled to approximately 300° C. by a gas cooling tower of vertical, indirect water-cooled type installed outside of the melt shop. Thereafter, the gases thus cooled are passed through air-cooled ducts, continuing to discharge heat until they reach the fan, and, upon reaching a predetermined gas temperature, are sent into a bag filter.

One example of actual measures of various numerical values in the flowpath in this fume evacuation system is set forth below.

The first important item is the velocity of the air infiltrating through the slag door. This velocity was measured and found to be 4.8 to 5.5 m/sec. When this is used in the following Eq. (1), the pressure within the furnace is indicated as being from −1.0 to −2.0 mm. H₂O.

$$(v^2/2\ g)\rho = P \tag{1}$$

where:
$v$ is the gas velocity, m/sec.;
$g$ is acceleration, m/sec.;
$\rho$ is air density; and
PP is pressure (mm. H₂O)

The results of analysis of the exhaust gases in the vicinity of the outlet of the suction, constituting a second important item, are shown in Table 6. The sampling time was 6 minutes after the second charge.

Table 6

| Composition of exhaust gas | |
|---|---|
| Constituent | Content (%) |
| $O_2$ | 0.3 |
| $CO_2$ | 25 |
| CO | 11 |

Table 6-continued

| Composition of exhaust gas | |
|---|---|
| Constituent | Content (%) |
| Others | 63.7 |

Figure 12:
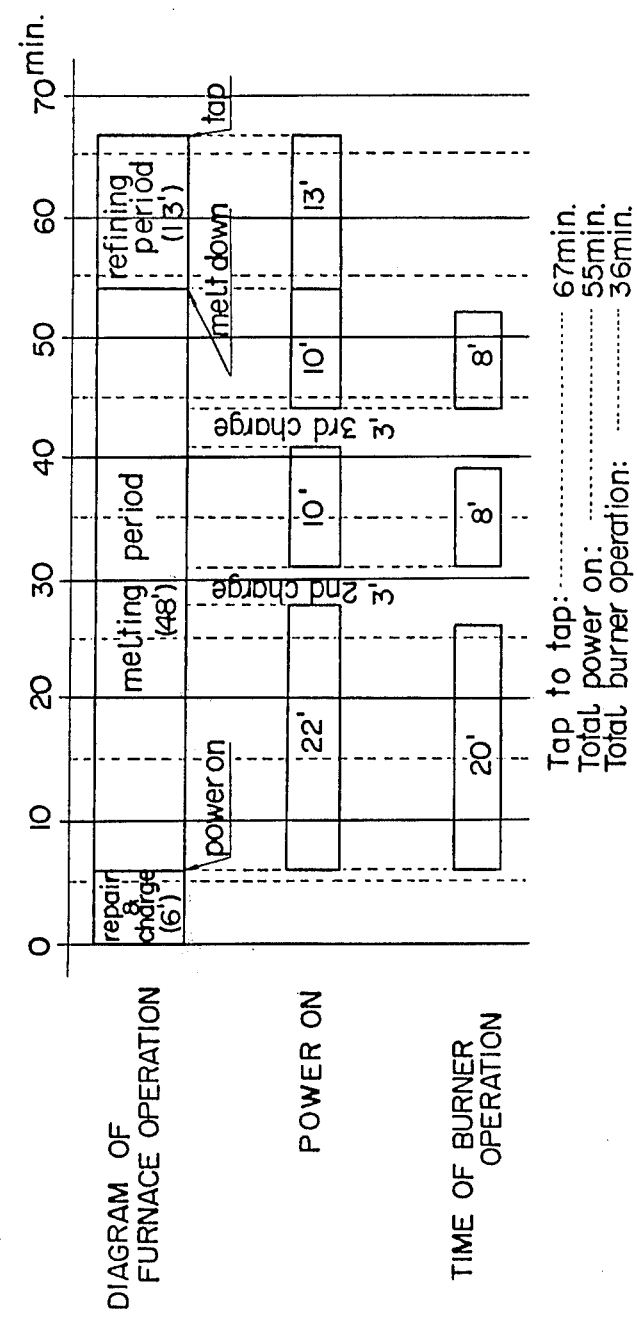
FIG. 12 is a time chart or diagram indicating one example of operation pattern in carrying out the process of the invention.

At this time, the flow rate and temperature of the exhaust gas immediately in front of exhaust fan, constituting a third important item, were 1,180 m³/min. and 180° C., respectively. The operation pattern of the time of measurement of the instant performance is indicated in FIG. 12. That is, this pattern is that of Heat No. 2,400 indicated in Table 2.

As set forth in Table 2, the particulars of this heat are: an oil consumption of 5.4 l/ton; an oxygen consumption of 45.0 Nm³/ton (of which the quantity of oxygen used in the burners was 36 Nm³/ton); a melting period of 48 minutes (during which the burners were used three separate times for a total of 36 minutes); a refining period of 13 minutes, a tap-to-tap time of 67 minutes (1 hr. 07 min.); and a power unit consumption of 337 kWH/ton.

When, from these results of performance, consideration is added to this direct suction type dust collector, the carbon of the fuel oil blown into the furnace through the burners, of the combustibles introduced together with the scrap into the furnace (on the assumption that 1.5 percent of oil is adhering to turning scrap blended in a quantity of 25 percent), of the electrodes, of the carbonaceous bricks, of a recarburizing agent, and of like materials is transformed into CO and $CO_2$ by the oxygen injected from the burners. Any deficient $O_2$ is made up by the oxygen in air infiltrating through openings such as the slagging door, whereupon CO and $CO_2$ gases are similarly formed, the ratio thereof being 11 versus 25.

Furthermore, the quantity of 63.7 percent of "Others" in Table 6 may be considered to be $N_2$ gas. Then, a balance is established between the total quantity of exhaust gas, the quantity of the oxygen blown in, and the quantity of air which has infiltrated. The quantity of the $O_2$ in the gas immediately after being discharged from the furnace is very low, being 0.3 percent below the actual performance result. This indicates that the introduction into the furnace of air infiltrating through the slagging door in order to elevate the combustion efficiency of the burners as emphasized in this invention does not rise to an excessively oxidizing atmosphere within the furnace. Moreover, it is apparent that a steelmaking process according to this invention fully exhibits high effectiveness is elevating the efficiency of an arc furnace.

The determination of the performance capacity of the fume evacuation system in the steelmaking apparatus of this invention can be calculated as described hereinbefore, but we have discovered that there exists a specific relationship between the melting capacity (tons/hr.) only during the melting period and the flow rate of the exhaust gas (Nm³/min.) of the arc furnace. More specifically, in terms of the exhaust has flowrate A and the melting capacity B, the following Eq. (2) is always constant.

$$A/B = K \tag{2}$$

In this case, K is a constant. When the value of this constant K is substituted into the following Eq. (3), the resulting value V becomes the capacity (flow rate of gas to be treated) of the fume evacuation system.

$$TK = V \quad (3)$$

where:

$V$ is the capacity (Nm$^3$/min.) of the fume evacuation system;

$T$ is the steelmaking capacity (tons/hr.).

We claim:

1. A process for producing steel by introducing a cold charge of steel scrap as raw material into an arc furnace which is provided with arc generating electrodes for producing ordinary steels and alloy steels, a plurality of burners for assisting the melting of the scrap, and evacuation means for drawing off the exhaust fumes from the furnace: said process comprising (a) injecting a stream of a mixture of air and fuel oil atomized in said air into the furnace through each of said burners thereby to combust the fuel oil to heat the scrap steel to a red-heat state; (b) injecting pure oxygen into the furnace in a quantity more than twice the theoretical quantity required for complete combustion in the form of a convergent stream encompassing each said stream of mixture at a relatively high velocity with respect thereto until said oxygen stream converges at an intersection with said stream of mixture at a point which is a certain distance downstream from the burners thereby to intensify the heating of said red-hot steel scrap and to carry out melt-cutting of the steel scrap melt so as to make the cut scrap melt fall onto the melt pool in the furnace bottom, thus, assisting the melting of the scrap together with red-heating of the steel scrap and, at the same time to combust combustibles having been charged into the furnace together with the steel scrap, extensions of said both streams being clear of the arc generating electrodes; and (c) during said operations, maintaining the furnace interior under a negative pressure of $-0.5$ to $-2.5$ mm H$_2$O by controlling said evacuation means thereby to draw in secondary air from outside into the furnace, thus, increasing the furnace combustion efficiency.

2. A process for producing steel as claimed in claim 1, in which said stream of a mixture of air and fuel oil and said pure oxygen stream are discharged from each of oxygen-fuel burners installed in cold parts of the furnace wall with a dip angle of the order of from 15 to 25 degrees with respect to the upper plane of the steel slag line and with orientations such that extensions of the burner centerlines are clear of the arc generating electrodes and converge and intersect with said plane of the slag line so as to be mutually intersected at a point somewhat short of the vertical centerline of the furnace.

3. A process for producing steel as claimed in claim 1 wherein the velocity of the oxygen stream is about 800 m/sec.

* * * * *